United States Patent [19]

Datta et al.

[11] 4,416,807

[45] Nov. 22, 1983

[54] CONDUCTIVE VIDEO DISCS

[75] Inventors: Pabitra Datta, Cranbury; Ronald N. Friel, Hamilton Square, both of N.J.

[73] Assignee: RCA Corporation, New York, N.Y.

[21] Appl. No.: 311,257

[22] Filed: Oct. 14, 1981

[51] Int. Cl.³ .............................................. H01B 1/06
[52] U.S. Cl. .................................... 252/511; 524/495; 524/496; 358/342; 358/344
[58] Field of Search ................ 252/511; 524/496, 495; 179/100.1 B, 100.4 R; 523/174; 358/128, 129; 274/41 A

[56] References Cited

U.S. PATENT DOCUMENTS

| | | | |
|---|---|---|---|
| 2,997,451 | 8/1961 | Miller | 260/41 |
| 3,842,194 | 10/1974 | Clemens | 178/6.6 A |
| 4,151,132 | 4/1979 | Khanna | 260/23 XA |
| 4,228,050 | 10/1980 | Martin et al. | 260/23 XA |

*Primary Examiner*—Josephine Barr
*Attorney, Agent, or Firm*—Birgit E. Morris; R. Hain Swope

[57] ABSTRACT

Conductive information discs comprised of conductive particles such as carbon black dispersed in a stable thermoplastic material comprising a homopolymer of styrene, an acrylic acid ester, or a methacrylic acid ester, a copolymer of styrene and acrylonitrile, an acrylic acid ester, or a methacrylic acid ester, or mixtures thereof, is disclosed.

14 Claims, No Drawings

CONDUCTIVE VIDEO DISCS

This invention relates to conductive video discs comprised of conductive particles such as carbon black dispersed in a thermally stable thermoplastic material. The thermoplastic material comprises a homopolymer of styrene, an ester of acrylic acid or methacrylic acid, a copolymer of styrene and acrylonitrile, an acrylic acid or methacrylic acid ester, and mixtures thereof.

BACKGROUND OF THE INVENTION

Information records containing video, audio and color information in the form of a very fine surface relief pattern which can be read capacitively are known. The surface relief pattern is monitored capacitively by a playback stylus and the surface variations are reconstituted in electrical signal form and converted back to information suitable for display by a television receiver.

In a system described by Clemens in U.S. Pat. No. 3,842,194, incorporated herein by reference, a capacitive system is employed wherein the disc and the playback stylus are electrically conducting and it is essential that a dielectric layer be interposed between them. Initially, the disc was of plastic coated with a metal layer which was in turn coated with a thin layer of dielectric. Fox et al in copending application "A Conductive Video Disc," Ser. No. 105,550, filed Dec. 20, 1979, describe improved high density information discs prepared by compression molding a plastic molding composition containing a sufficient amount of conductive particles, such as carbon black, so that discs can provide capacitance readout.

The composition of Fox et al is comprised of a homopolymer or copolymer of vinyl chloride containing conductive particles and stabilizers, lubricants and processing aids. The conductive capacitive information disc records made from such compositions may utilize either a grooved or non-grooved information disc record system.

Improvements in the original formulations of Fox et al are disclosed in Khanna, U.S. Pat. No. 4,151,132 and Martin et al U.S. Pat. No. 4,228,050. However, these improved formulations, like those of Fox et al, are based on vinyl chloride homopolymers or copolymers. Products produced from these resins have a tendency to be moisture sensitive, both during processing and upon storage under ambient conditions, particurlarly in a hot, damp climate. In addition, such resins, e.g. PVC, are thermally unstable and will decompose during processing at elevated temperatures, liberating hydrochloric acid. The hydrochloric acid will react with other constituents of the formulation to form, e.g. hydroscopic salts and organic reaction products which may have a deleterious effect on the playback performance of the video disc. Further, PVC, after it has undergone processing at elevated temperatures, has a tendency to slowly decompose liberating hydrochloric acid which can cause reactions on the surface of the video disc that will interfere with the quality of playback. Because of these problems, all of the above-mentioned formulations have numerous ingredients which are balanced to create a product with acceptable workability, performance and stability. There exists, however, a need for a more stable conductive molding composition for video discs which contains substantially fewer components and is at least comparable to the present formulation in processing and performance. Such formulations are provided in accordance with this invention.

SUMMARY OF THE INVENTION

In accordance with this invention, conductive molding compositions for capacitive high density information discs are provided which are more stable than, and otherwise at least comparable to, the presently ulitized PVC based conductive molding compositions. The conductive molding compositions of this invention contain as the thermoplastic resin ingredient a homopolymer of styrene or an acrylic monomer, or their copolymers.

DETAILED DESCRIPTION OF THE INVENTION

The physical characteristics and performance criteria of a capacitive high density information disc, i.e., a video disc, require that the molding composition therefor have a uniform dispersion of conductive particles. The discs molded therefrom must have a uniform surface free of defects, minimum shrinkage and warp characteristics and a high heat distortion temperature. In addition, the discs must be stable under all processing, shipping and storage conditions. The molding composition must be readily processable to form a very small relief pattern over the surface of a 12 inch (30.5 cm) disc. The conductive molding composition of this invention meets or exceeds minimum acceptance criteria in all of these areas.

The thermoplastic resin component of the conductive molding compositions of this invention is selected from the group consisting of: a homopolymer of styrene, an acrylic acid ester or a methacrylic acid ester; a copolymer of styrene and acrylonitrile, an acrylic acid ester, or a methacrylic acid ester; and mixtures thereof. By "esters" of acrylic or methacrylic acid is meant generally lower alkyl and lower alkenyl esters, particularly methylmethacrylate and ethylmethacrylate. When mixtures of the above resins are utilized, they may be combined in any proportion and may include two or more homopolymers, two or more copolymers or at least one homopolymer and at least one copolymer. Copolymers may contain monomer components in any proportion.

Preferred thermoplastic resins in accordance with this invention include polystyrene, such as is commercially available as R-510-82from the Richardson Company, polymethylmethacrylate, for example, Rohm and Haas Company's VAS, styrene-methylmethacrylate copolymers commercially available as NAS and NOAN resins from the Richardson Company, and styrene-acrylonitrile copolymers such as are commercially available as SAN-33 from Monsanto Company. The subject conductive molding compositions containing these resins can be processed at materially higher shear rates than the present PVC compositions, are infinitely more stable at presently used processing temperatures and have a markedly higher heat distortion temperature. The amount of the above-named resins in the conductive molding compositions of this invention will depend on the concentrations of the other ingredients, particularly the conductive particles. Generally, however, the resin is present in the compositions of this invention in from about 70 to about 85, preferably from about 73 to about 80, percent by weight.

The conductive particles suitable for use in the molding compositions of this invention are preferably highly electrically conductive, finely divided carbon blacks, particularly those having a low bulk density and large surface area to minimize loading requirements. Presently preferred carbon blacks are Cabot CSX-175, available from Cabot Corporation and Ketjenblack EC, a product of the Armak Company. Other carbon blacks may be utilized, in whole or in part, provided that they meet specified electrical requirements. The conductive molding compositions of this invention contain a sufficient amount of conductive particles so that an information disc molded therefrom is capable of capacitive playback. Preferably, sufficient conductive particles are present to give the conductive molding composition a bulk resistivity below 500 ohm-cm at 900 megahertz. Generally, the subject conductive molding compositions will contain from about 10 to about 35, preferably from about 12 to about 18, percent by weight of the conductive particles. Denser particles of carbon will generally require higher loading, i.e., in the upper portion of this range, to obtain an equivalent electrical conductivity.

The conductive molding compositions of this invention represent a distinct improvement over present PVC molding compositions in that the latter requires from 8 to as many as 15 additives whereas the subject compositions generally require only two, i.e. a flow modifier and a lubricant.

The flow modifier is present as an adjunct to processing of the subject molding compositions. Suitable flow modifiers include, for example, diphenylphthalate, dicyclohexylphthalate, hydrogenated terphenyls available as HB-40 from Monsanto Co., T-butylphenyl diphenyl phosphate available as Santicizer-154, from Monsanto Co. tridecylmellitate available as Morflex 530 from Pfizer Co., and the like. Preferred flow modifiers in accordance with this invention are diphenylphthalate and dicyclohexylphthalate. The subject conductive molding compositions contain from about 2 to about 10 percent by weight, preferably about 5 percent by weight of the flow modifier.

The subject conductive molding compositions contain a lubricant as an adjunct in preventing high shear heating during processing and to provide good release of the molded disc or other article from the mold. Suitable lubricants include, for example, polyvinyl stearate, metal stearates such as zinc stearate or calcium stearate, Loxiol G-30, a mixture of monoesters of varying molecular weight alcohols and fatty acids and Loxiol G-70, a polyfunctional complex ester of saturated fatty acids, both commercially available from Henkel International GmbH, Acrowax C, a mixed ester preparation available from Glyco Chemical, Inc. a non-polar silicone fluid such as those available as DC-531 and DC-1247 from Dow Corning and SF-1147 from General Electric Company, a polar silicone fluid such as Shin Etsu B-9 available from Shin Etsu Co. of Japan, 1,3-bis(4-hydroxybutyl)-1,3-dimethyldodecyldisiloxane, and the like. The last-named lubricant is disclosed in copending application of Wang et al, Ser. No. 231,859 filed Feb. 5, 1981, now U.S. Pat. No. 4,355,062, the disclosure of which is incorporated herein by reference. The lubricant is present in the molding compositions of this invention in amounts of from about 0.25 to about 2.5 percent by weight, preferably from about 0.5 to about 1 percent by weight.

The subject molding compositions can be prepared by mixing the ingredients in a suitable mixer, initially at low speed, then at high speed until the temperature reaches 120° C. The subject molding compositions are advantageous over comparable PVC compositions in that they do not fuse at high blending speeds. Mixing is carried out for from about 5 to 20 minutes after which the composition is transferred to a Banbury mixer or other suitable apparatus to melt the ingredients under shear. The composition is mixed until it is molten, e.g. when it reaches a temperature of from about 180°-250° C. after which it is mixed in a two roll mill at 200° C. for 4 minutes to form a sheet and pelletized for storage. Molded articles, particularly video discs, can be made by compression molding in conventional manner, e.g. by forming a preform and compression molding using a 10 to 60 second cycle at about 190°-200° C. and removing the flashing. The short cycle time of the subject molding compositions is likewise an improvement over presently used PVC compositions.

It is preferred that a thin lubricant layer be applied to the surface of video discs prepared from the subject molding compositions. This film serves as an added dielectric layer and also serves to reduce stylus wear during playback. One such lubricant which has been successfully applied to such discs is a fractionated, purified methyl alkyl siloxane of the formula

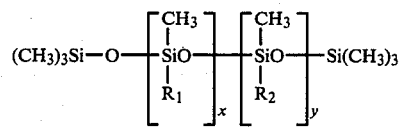

wherein $R_1$ and $R_2$ are alkyl groups of 4–20 carbon atoms, x is an integer of 2–4, y is an integer of 0–2 and the sum of x and y is 4 or less. Such lubricants may, if desired, be doped with a small quantity of 1,3-bis(4-hydroxybutyl)-1,3-dimethyldodecyldisiloxane and/or N,N-bis-(2-hydroxyethyl)-N-(3′-dodecyloxy-2′-hydroxypropyl)-methylammonium methosulfate.

These lubricants can be applied by spraying or spinning from solution or evaporating onto the disc. surface.

The following Examples further illustrate this invention, it being understood that the invention is in no way intended to be limited to the details described therein. In the Examples, all parts and percentages are on a weight basis and all temperatures are in degrees Celsius, unless otherwise stated.

COMPARATIVE EXAMPLE

A conductive molding composition was prepared according to the teachings of Martin et al, U.S. Pat. No. 4,228,050, from the following ingredients: 77.0 parts of polyvinylchloride, BFG 110X of the BF Goodrich Company; 14.0 parts of Ketjenblack EC, carbon black of the Armak Company; 1.5 parts of dibutyltin-β-mercaptopropionate, T-35 available from M & T Chemical Co.; 1.0 part of dibutyltin maleate, Mark 275 from Argus Chemical Company; 2.0 parts of Acryloid K-147 and 0.75 part of Acryloid k-275, acrylic modifiers of Rohm & Haas Co.; 0.5 part of Loxiol G-30 and 0.25 part of Loxiol G-70, lubricants of Henkel International GmbH.; 1.0 part of calcium stearate and 2.0 parts of diundecylphthalate.

Some of the molding composition was retained for testing and the remainder was compression molded into video discs according to the teachings of Martin et al.

EXAMPLE 1

Formulations containing 74 parts of polymer, as listed below, 15 parts of Ketjenblack EC, 10 parts of dicyclohexylphthalate and 1 part of zinc stearate were blended on a Henshel mixer at 3800 rpm for 10 minutes.

| Formulation | Polymer |
|---|---|
| A | Polystyrene |
| B | 70/30 Styrene-methylmethacrylate copolymer: NAS by Richardson Company |
| C | 80/20 Styrene-methylmethacrylate copolymer: NOAN by Richardson Company |
| D | Styrene-Acrylonitrile copolymer: SAN-33, Monsanto Company |
| E | Methylmethacrylate homopolymer: (Acrylic-VS, Rohm & Haas) |

Each of the five formulations as well as a sample of the formulation from the comparative example (control) was tested in a Haake Torque Rheometer. Fifty five gram samples were used, 200° starting temperature and 120 rpm. The results are reported in Table I. The stability time in the test is the point in time where a distinct change in the structure of the resin takes place with a resulting significant increase in both torque and temperature. In the instance of the control formulation, this is the result of the resin losing HCl and cross-linking. The heat distortion temperature is the temperature at which discs pressed from each formulation begin to deform at a rapid rate over a narrow increase in temperature.

TABLE I

| Formulation | Torque (meter/gm) Fusion | Torque (meter/gm) Equilibrium | Stability Time (Min.) | Heat Distortion Temp. |
|---|---|---|---|---|
| Control | 3600 | 1225 | 28 | 55° |
| A | 1900 | 610 | 70 | 93° |
| B | 2050 | 625 | >90 | 88° |
| C | 1800 | 500 | >90 | 90° |
| D | 1550 | 450 | >90 | 95° |
| E | 1250 | 500 | >90 | 95° |

The superiority of the formulations of this invention in comparison to the control is clearly evident from the above data.

EXAMPLE 2

Various properties of certain formulations from Example 1 were tested vs. the control as follows.

Utilizing an Instron Capillary Rheometer fitted with a die 0.050 inch in diameter and 2.0089 inches in length with an L/D ratio of 40, the apparent melt viscosity as a function of shear rate was determined at 200° and 210° for formulations B and D from Example 1 and at 200° for control. The melt viscosities of formulations B and D were considerably lower at 210° than the control at 200°, indicating that formulations B and D are stable at 200°.

The AC and DC resistivities of the five formulations vs. the control were also determined. The results are reported in Table II.

TABLE II

| Formulation | Resistivity Ω-cm 900 MHz | DC |
|---|---|---|
| Control | | |
| A | 1.9 | 4.5 |
| B | 3.55 | 6.0 |
| C | 3.4 | 3.0 |
| D | 2.2 | 3.0 |
| E | 1.2 | 2.5 |
| E-1* | 3.4 | 2.5 |
| E-2* | 10.3 | 10.0 |

*Formulations E-1 and E-2 contained: 79 parts of the resin, 10 parts of carbon black, 10 parts of flow modifier and 1 part of lubricant; and 84 parts of resin, 5 parts of carbon black, 10 parts of flow modifier and 1 part of lubricant, respectively. It is evident that the resistivities of the acrylic homopolymer formulations are significantly lower than either the PVC formulation (control) or any of the styrene copolymer-containing formulations.

As further evidence of the unexpectedly high conductivity of the acrylic homopolymer formulations of this invention, formulation E was tested against formulation D, styrene-acrylonitrile copolymer, and the control for conductivity at 910 MHz. In this test, the amount of carbon black in each formulation was gradually increased beginning at 5 percent and going to 17 percent. All other ingredients in each formulation remained constant. The results are reported in Table III.

TABLE III

| Formulation | Resistivity in Ω/cm at 910 MHz for Percent Carbon Black | | | | |
|---|---|---|---|---|---|
| | 5% | 10% | 12% | 15% | 17% |
| Control | 40 | 15 | 8 | 3 | 2.5 |
| D | 30 | 10 | 5 | 2 | 1.5 |
| E | 10.3 | 1.4 | 1.5 | 1.7 | 1 |

The superior conductivity of the acrylic homopolymer compositions of this invention is readily apparent from the data in Table III.

EXAMPLE 3

Video discs were compression molded from formulations A, D and E of Example 1 at about 190°. The discs played well in comparison to the control. Discs prepared from the control and all formulations were sprayed with a 0.06 percent solution in heptane of a fractionated, purified methyl alkyl siloxane lubricant of the formula

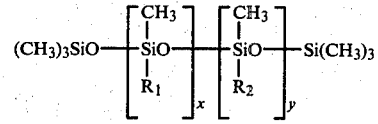

wherein $R_1$ and $R_2$ are alkyl groups of 4-20 carbon atoms, x is an integer of 2-4, y is an integer of 0-2 and the sum of x and y is 4 or less. In addition, sample discs prepared from formulations D and E were sprayed with the same lubricant doped with 15% of 1,3-bis(4-hydroxybutyl)-1,3-dimethyldodecyldisiloxane. The discs were tested for playback performance as well as carrier distress, i.e. picture interruption, in seconds per hour of play. The discs were tested at initial play and after being held for 2 hours at 100° F. and 95 percent relative humidity. The results are reported in Table IV.

TABLE IV

| | Playback Performance | | | Carrier Distress in Seconds | | | | | |
|---|---|---|---|---|---|---|---|---|---|
| | Carrier Output | Carrier to Noise (db) | | Virgin Play | | | After Hot/Wet Stress | | |
| Formulation | MV pp | Video | Audio | Median | Range | Na/Nt | Median | Range | Na/Nt |
| Control | 2.3 | 46 | 25 | 2.5 | 0.8–8 | 4/6 | 450 | 80–950 | 0/6 |
| A | 2.3 | 42 | 22 | 1.5 | 0.8–6 | 4/6 | 210 | 77–500 | 0/6 |
| D | 2.3 | 46 | 24 | 0.5 | 0.2–6 | 3/6 | 150 | 99–700 | 0/6 |
| D* | 2.3 | 46 | 24 | 1.0 | 0.5–8 | 4/6 | 2 | 2–10 | 4/6 |
| E | 3.7 | 49 | 27 | 0.4 | 0.1–8 | 3/6 | 215 | 152–530 | 0/6 |
| E* | 3.7 | 49 | 27 | 0.8 | 0.1–6 | 5/6 | 1.2 | 0.5–7 | 5/6 |

*Doped lubricant

In the Table, carrier distress time is measured by adding the amount of time in seconds (but discounting intervals less than 10 microseconds) when the r.f. output of the player arm is less than 150 millivolts peak to peak (MV pp), referenced to a 1 volt reference level, and the time when the r.f. output is above 8.6 megahertz or below 3.1 megahertz in frequency, indicating a defect. Such defects are noted by the viewer as long dropouts, up to a complete loss of picture and sound information. The present pass criteria for a video disc is a maximum of 3 seconds in 60 minutes of playback time and good quality is considered to be less than 0.3 second in 60 minutes of playback time. In the Table, the designation Na/Nt indicates number of discs accepted out of number tested.

As is evident from the above data, the formulations according to this invention compare favorably with the control. The doping of the lubricant in the case of formulations D and E produced a significant reduction in carrier distress. The exact mechanism responsible for this improvement is not known.

We claim:

1. A conductive molding composition comprising:
   (a) sufficient conductive carbon black particles so that the composition has a bulk resistivity below 500 ohm-cm at 900 megahertz;
   (b) from about 0.25 to about 2.5 percent by weight of a suitable lubricant;
   (c) from about 2 to about 10 percent by weight of a suitable flow modifier; and
   (d) a thermoplastic material selected from the group consisting of: a homopolymer of styrene, an acrylic acid ester, or a methacrylic acid ester; a copolymer of styrene and acrylonitrile, an acrylic acid ester or a methacrylic acid ester; and mixtures thereof.

2. A conductive molding composition in accordance with claim 1, wherein said thermoplastic material is a copolymer of styrene and methlymethacrylate.

3. A conductive molding composition in accordance with claim 1, wherein said thermoplastic material is a compolymer of styrene and acrylonitrile.

4. A conductive molding composition in accordance with claim 1, wherein said thermoplastic material is a homopolymer of methylmethacrylate.

5. A conductive molding composition in accordance with claim 1 wherein said lubricant is present in from about 0.5 to about 1 percent by weight and said flow modifier is present in about 5 percent by weight.

6. A conductive molding composition in accordance with claim 1, wherein said lubricant is selected from the group consisting of metal stearates and polar silicon fluids.

7. A conductive molding composition in accordance with claim 6, wherein said lubricant is zinc stearate.

8. A conductive molding composition in accordance with claim 1, wherein said flow modifier is selected from the group consisting of diphenylphthalate and dicyclohexylphthalate.

9. A conductive molding composition in accordance with claim 8, wherein said flow modifier is diphenylphthalate.

10. A conductive molding composition in accordance with claim 8, wherein said flow modifier is dicyclohexylphthalate.

11. A high density information record adapted for use with a playback stylus to effect recovery of signals occupying a bandwidth of at least several megahertz when relative motion at a desired rate is established between said record and said stylus, said record containing an information track constituted by a surface relief pattern in said track to accommodate recovery of signals of said bandwidth upon establishment or relative motion at said rate, said record comprising a disc of a conductive composition comprising:
   (a) sufficient conductive carbon black particles so that the composition has a bulk resistivity below 500 ohm-cm at 900 megahertz;
   (b) from about 0.25 to about 2.5 percent by weight of a suitable lubricant;
   (c) from about 2 to about 10 percent by weight of a suitable flow modifier; and
   (d) a thermoplastic material selected from the group consisting of: a homopolymer of styrene, an acrylic acid ester, or a methacrylic acid ester; a copolymer of styrene and acrylonitrile, an acrylic acid ester or a methacrylic acid ester; and mixtures thereof.

12. An information record in accordance with claim 11, wherein said thermoplastic material is a copolymer of styrene and methylmethacrylate.

13. An information record in accordance with claim 11, wherein said thermoplastic material is a copolymer of styrene and acrylonitrile.

14. An information record in accordance with claim 11, wherein said thermoplastic material is a homopolymer of methylmethacrylate.

* * * * *